US012736381B2

(12) United States Patent
Verma

(10) Patent No.: US 12,736,381 B2
(45) **Date of Patent: *Sep. 15, 2026**

(54) FLOW SENSOR SUB-ASSEMBLY IN AN ULTRASONIC FLOW METER INCLUDING AN ABSORBER SLEEVE ENGAGING A COUPLER AND A FLOW TUBE

(71) Applicant: Becton, Dickinson and Company, Franklin Lakes, NJ (US)

(72) Inventor: Kaushal Verma, Bridgewater, NJ (US)

(73) Assignee: Becton, Dickinson and Company, Franklin Lakes, NJ (US)

(*) Notice: Subject to any disclaimer, the term of this patent is extended or adjusted under 35 U.S.C. 154(b) by 258 days.

This patent is subject to a terminal disclaimer.

(21) Appl. No.: 18/428,736

(22) Filed: Jan. 31, 2024

(65) Prior Publication Data

US 2024/0167863 A1 May 23, 2024

Related U.S. Application Data

(63) Continuation of application No. 17/154,015, filed on Jan. 21, 2021, now Pat. No. 11,927,467.

(60) Provisional application No. 62/964,309, filed on Jan. 22, 2020.

(51) Int. Cl.
*G01F 15/18* (2006.01)
*G01F 1/66* (2022.01)

(52) U.S. Cl.
CPC ............ *G01F 15/185* (2013.01); *G01F 1/662* (2013.01)

(58) Field of Classification Search
CPC ......... G01F 15/14; G01F 15/185; G01F 1/662
See application file for complete search history.

(56) References Cited

U.S. PATENT DOCUMENTS

| | | | | |
|---|---|---|---|---|
| 4,299,336 | A | 11/1981 | Studer | |
| 4,352,459 | A | 10/1982 | Berger et al. | |
| 4,474,180 | A | 10/1984 | Angulo | |
| 4,561,438 | A | 12/1985 | Bonnet et al. | |
| 5,131,279 | A | 7/1992 | Lang et al. | |
| 5,221,282 | A | 6/1993 | Wuchinich | |
| 5,463,906 | A | 11/1995 | Spani et al. | |
| 6,155,463 | A | 12/2000 | Dentler | |
| 6,435,030 | B1 | 8/2002 | Gysling et al. | |
| 6,490,933 | B2 * | 12/2002 | Koyano | G01F 1/662 73/861.27 |
| 6,644,130 | B2 * | 11/2003 | Imai | G01F 1/667 73/861.27 |

(Continued)

FOREIGN PATENT DOCUMENTS

| | | | |
|---|---|---|---|
| CN | 104344859 | A | 2/2015 |
| CN | 207007246 | U | 2/2018 |

(Continued)

*Primary Examiner* — Tran M. Tran
(74) *Attorney, Agent, or Firm* — The Webb Law Firm

(57) ABSTRACT

A flow sensor sub-assembly for sensing flow of a fluidic medicament includes a flow tube having an inlet and an outlet, a first coupler secured to the inlet of the flow tube, a second coupler secured to the outlet of the flow tube, a first piezo element secured to the first coupler, a second piezo element secured to the second coupler to define a predetermined distance between the first piezo element and the second piezo element, and at least one absorber sleeve engaged with the first coupler, the flow tube, and the second coupler.

19 Claims, 5 Drawing Sheets

(56) References Cited

U.S. PATENT DOCUMENTS

| | | | | |
|---|---|---|---|---|
| 6,668,664 | B1 * | 12/2003 | Ohkawa | G01F 1/667 73/861.27 |
| 6,981,960 | B2 | 1/2006 | Cho et al. | |
| 7,255,006 | B2 | 8/2007 | Spanke et al. | |
| 7,264,885 | B2 | 9/2007 | Rosen et al. | |
| 7,383,741 | B2 | 6/2008 | Fukano et al. | |
| 7,560,494 | B2 | 7/2009 | Steinbrenner et al. | |
| 7,782,202 | B2 | 8/2010 | Downie et al. | |
| 7,976,508 | B2 | 7/2011 | Hoag | |
| 8,544,344 | B2 | 10/2013 | Murakami | |
| 8,698,378 | B2 * | 4/2014 | Mueller | G10K 11/02 310/346 |
| 8,714,030 | B1 | 5/2014 | Liu et al. | |
| 8,904,878 | B2 | 12/2014 | Wiest et al. | |
| 9,320,493 | B2 | 4/2016 | Visveshwara | |
| 9,541,431 | B2 | 1/2017 | Nakano et al. | |
| 9,588,934 | B2 * | 3/2017 | Murakami | G01F 1/668 |
| 9,970,794 | B2 | 5/2018 | DeKalb | |
| 11,898,889 | B2 * | 2/2024 | Erdler | G01L 9/0051 |
| 12,117,324 | B2 * | 10/2024 | Bruggeman | G10K 11/161 |
| 12,422,287 | B2 * | 9/2025 | DeKalb | G01F 1/662 |
| 12,449,289 | B2 * | 10/2025 | Helfenstein | G01F 1/662 |
| 2002/0033055 | A1 | 3/2002 | Ohkawa | |
| 2004/0162540 | A1 | 8/2004 | Walenciak et al. | |
| 2005/0166684 | A1 | 8/2005 | Hirayama et al. | |
| 2007/0034016 | A1 | 2/2007 | Maginnis et al. | |
| 2007/0227263 | A1 | 10/2007 | Fukano et al. | |
| 2009/0157040 | A1 | 6/2009 | Jacobson et al. | |
| 2009/0204005 | A1 | 8/2009 | Keast et al. | |
| 2009/0264768 | A1 | 10/2009 | Courtney et al. | |
| 2009/0270844 | A1 | 10/2009 | Seeley et al. | |
| 2010/0063765 | A1 | 3/2010 | Carlisle et al. | |
| 2010/0237254 | A1 | 9/2010 | Mason et al. | |
| 2014/0033827 | A1 | 2/2014 | Satou et al. | |
| 2014/0311253 | A1 * | 10/2014 | Iwasa | G01F 1/667 73/861.21 |
| 2015/0204705 | A1 | 7/2015 | Forster et al. | |
| 2015/0211904 | A1 | 7/2015 | Forster | |
| 2017/0059375 | A1 | 3/2017 | DeKalb | |
| 2017/0059377 | A1 | 3/2017 | DeKalb | |
| 2017/0261280 | A1 | 9/2017 | Glisovic et al. | |
| 2018/0093148 | A1 | 4/2018 | Tsukamoto et al. | |
| 2018/0093210 | A1 | 4/2018 | Schmieder et al. | |
| 2018/0305930 | A1 | 10/2018 | Martin et al. | |

FOREIGN PATENT DOCUMENTS

| | | | |
|---|---|---|---|
| CN | 107949408 | A | 4/2018 |
| CN | 109219457 | A | 1/2019 |
| CN | 208693927 | U | 4/2019 |
| CN | 209085689 | U | 7/2019 |
| DE | 102008055167 | A1 | 7/2010 |
| EP | 0897102 | A1 | 2/1999 |
| EP | 2835620 | A1 | 2/2015 |
| EP | 2857803 | A1 | 4/2015 |
| JP | S6155696 | A | 3/1986 |
| JP | 2004264221 | A | 9/2004 |
| JP | 2006220534 | A | 8/2006 |
| JP | 2007263796 | A | 10/2007 |
| JP | 2012052641 | A | 3/2012 |
| JP | 2012513714 | A | 6/2012 |
| JP | 2017090268 | A | 5/2017 |
| JP | 6231754 | B2 | 10/2017 |
| JP | 2018532456 | A | 11/2018 |
| WO | 0209795 | A2 | 2/2002 |
| WO | WO2004015377 | A2 | 2/2004 |
| WO | WO2008152031 | A2 | 12/2008 |
| WO | 2010072506 | A1 | 7/2010 |
| WO | 2011126895 | A2 | 10/2011 |
| WO | 2014016315 | A1 | 1/2014 |
| WO | 2014016316 | A1 | 1/2014 |
| WO | 2014125720 | A1 | 8/2014 |
| WO | WO2019116269 | A1 | 6/2019 |

* cited by examiner

10
A
B
26
32
12
28
30
18
22
24
20
14
16

FLOW SENSOR SUB-ASSEMBLY IN AN ULTRASONIC FLOW METER INCLUDING AN ABSORBER SLEEVE ENGAGING A COUPLER AND A FLOW TUBE

CROSS-REFERENCE TO RELATED APPLICATION

The present application is a continuation of U.S. patent application Ser. No. 17/154,015, entitled "Flow Sensor Sub-Assembly in an Ultrasonic Flow Meter Including an Absorber Sleeve Engaging a Coupler and a Flow Tube" filed Jan. 21, 2021, which claims priority to U.S. Provisional Application Ser. No. 62/964,309, entitled "Apparatus and Method to Join a Coupler and Flow Tube in an Ultrasonic Flow Meter" filed Jan. 22, 2020, the entire disclosures of each of which are hereby incorporated by reference in their entirety.

BACKGROUND OF THE INVENTION

Field of the Disclosure

The present application relates generally to a flow sensor sub-assembly for sensing flow of a fluidic medicament.

Description of the Related Art

Referring to FIGS. 1 and 2, a flow sensor system 1 utilizing an ultrasonic flowmeter includes a flow tube sub-assembly 2 having two piezoelectric transducers 4 coupled to a fluid flow tube 6. The transducers 4 are attached to first and second couplers 7,8, respectively, with the flow tube 6 attached to the couplers 7,8. When a transducer 4 is excited by an electrical pulse, ultrasonic waves are transmitted into the fluid and the flow tube 6. The system analyzes the waves traveling through the fluid to determine a velocity, which is proportional to a shift between signals received from the upstream transducer and the downstream transducer. The waves or signals traveling within the flow tube material is undesirable and treaded as signal noise. The flow tube sub-assembly 2 includes an absorber tube 9 positioned over the flow tube 6 between the couplers 7,8. The ultrasonic energy traveling though the flow tube 6 is reduced by the absorber tube 9. The system 1 of FIGS. 1 and 2 may be the flow sensor system of U.S. Pat. No. 9,970,794, which is hereby incorporated by reference in its entirety.

SUMMARY OF THE INVENTION

In one aspect or embodiment, a flow sensor sub-assembly for sensing flow of a fluidic medicament includes a flow tube having an inlet and an outlet, a first coupler secured to the inlet of the flow tube, a second coupler secured to the outlet of the flow tube, a first piezo element secured to the first coupler, a second piezo element secured to the second coupler to define a predetermined distance between the first piezo element and the second piezo element, and at least one absorber sleeve engaged with the first coupler, the flow tube, and the second coupler.

The at least one absorber sleeve may include a first absorber sleeve engaged with the first coupler and the flow tube and a second absorber sleeve engaged with the second coupler and the flow tube, with the first absorber sleeve spaced from the second absorber sleeve to define a gap. The flow tube may not be covered by any absorbing material in the gap between the first absorber sleeve and the second absorber sleeve. The first absorber sleeve and the second absorber sleeve may each cover at least 10% of a length of the flow tube between the first and second couplers. The first absorber sleeve and the second absorber sleeve may each cover 25% of the length of the flow tube between the first and second couplers. The at least one absorber sleeve may include a thermoplastic polyurethane and the flow tube may include a stainless steel.

The flow tube may be secured to the first coupler and the second coupler via the at least one absorber sleeve. An interface between the first and second couplers and the flow tube may be free from adhesive.

The at least one absorber sleeve may be press-fit to the first and second couplers and the flow tube. The at least one absorber sleeve may be adhered to the first and second couplers and the flow tube. The at least one absorber sleeve may be overmolded onto the first and second couplers and the flow tube.

In a further aspect or embodiment, a flow sensor sub-assembly for sensing flow of a fluidic medicament includes a flow tube having an inlet and an outlet, a first coupler secured to the inlet of the flow tube, a second coupler secured to the outlet of the flow tube, a first piezo element secured to the first coupler, a second piezo element secured to the second coupler to define a predetermined distance between the first piezo element and the second piezo element, and the at least one absorber sleeve, with the flow tube secured to the first coupler and the second coupler via the at least one absorber sleeve.

BRIEF DESCRIPTION OF THE DRAWINGS

The above-mentioned and other features and advantages of this disclosure, and the manner of attaining them, will become more apparent and the disclosure itself will be better understood by reference to the following descriptions of aspects of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 1:
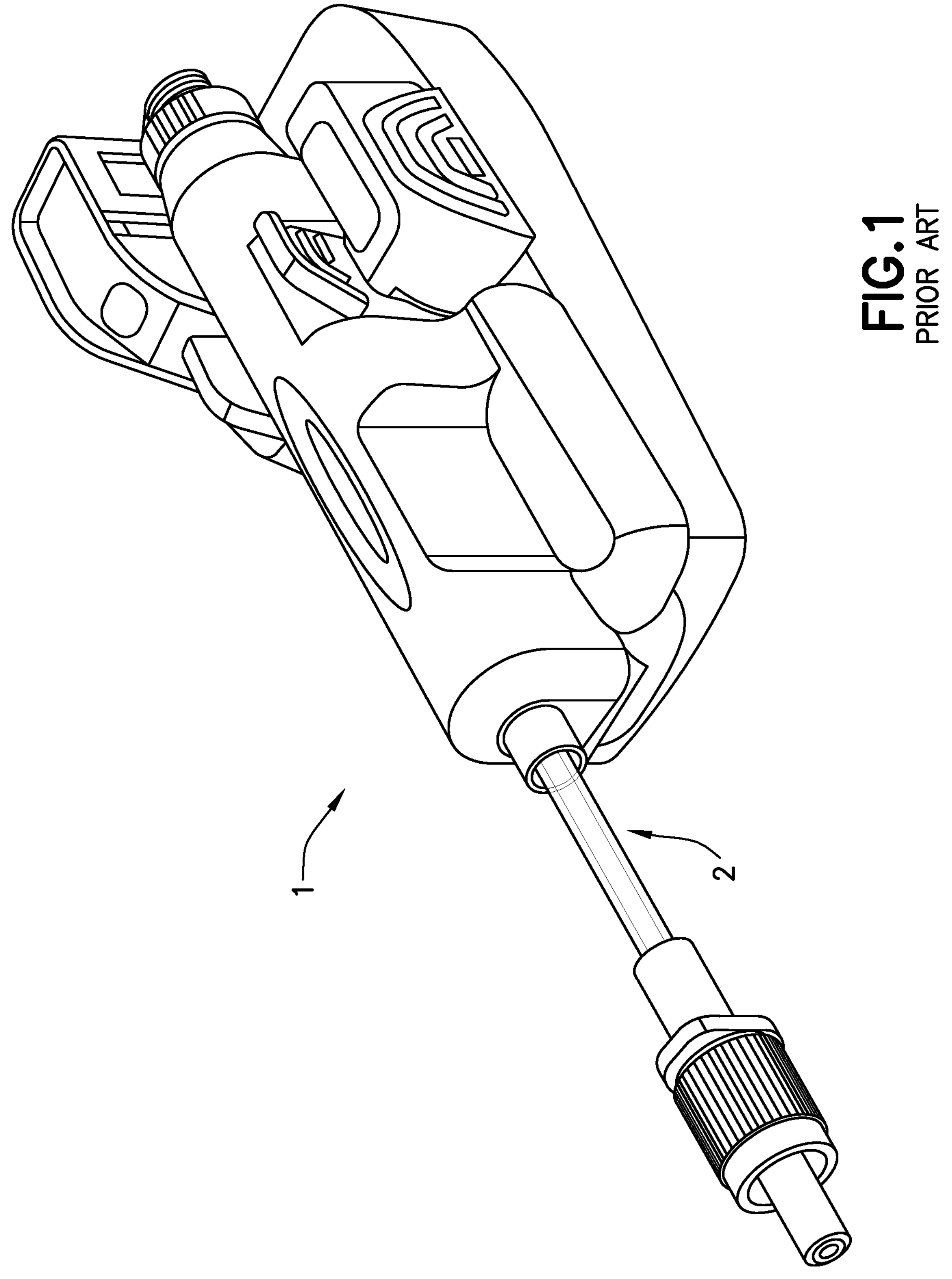
FIG. 1 is a perspective view of a conventional flow sensor system.
Figure 2:
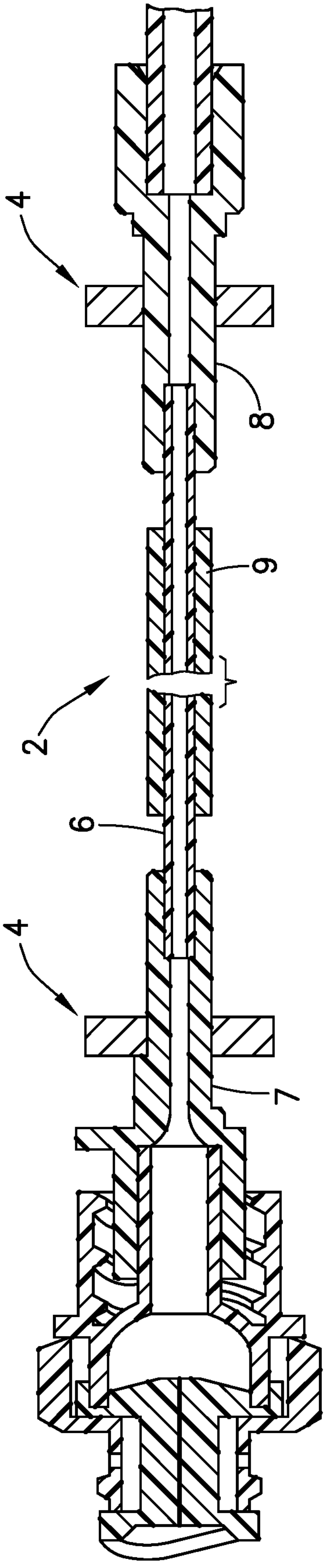
FIG. 2 is a cross-sectional view of a flow tube sub-assembly of the conventional flow sensor system of FIG. 1.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms “upper”, “lower”, “right”, “left”, “vertical”, “horizontal”, “top”, “bottom”, “lateral”, “longitudinal”, and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting. All numbers and ranges used in the specification and claims are to be understood as being modified in all instances by the term “about”. By “about” is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of “1 to 10” should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms “first”, “second”, and the like are not intended to refer to any particular order or chronology, but refer to different conditions, properties, or elements.

Figures 3, 3A, 3B:
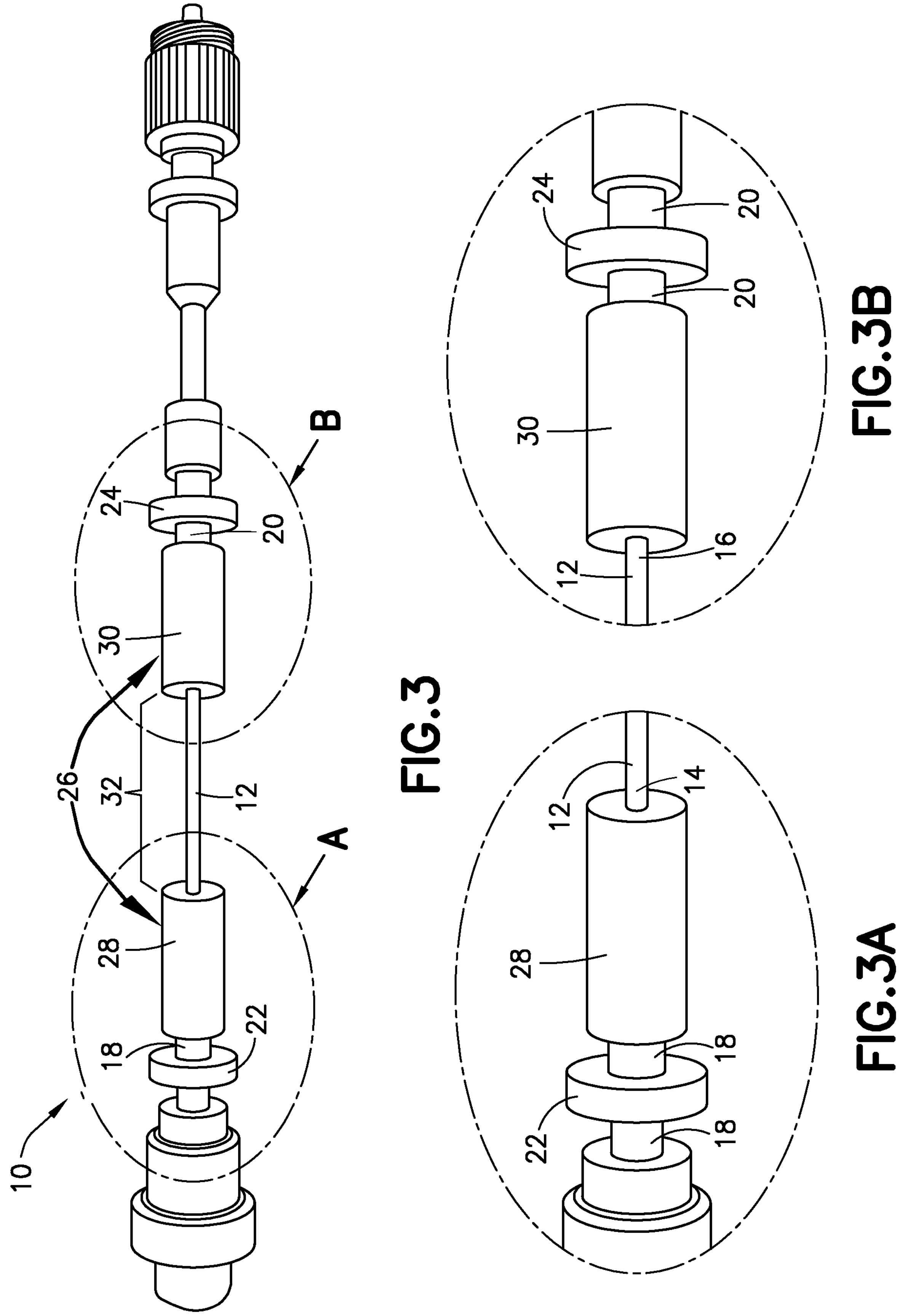
FIG. 3 is a top view of a flow tube sub-assembly according to one aspect or embodiment of the present application.
FIG. 3A is an enlarged view of area A of the flow tube sub-assembly of FIG. 3.
FIG. 3B is an enlarged view of area B of the flow tube sub-assembly of FIG. 3.

Referring to FIGS. 3, 3A, and 3B, a flow sensor sub-assembly 10 for sensing flow of a fluidic medicament includes a flow tube 12 having an inlet 14 and an outlet 16, a first coupler 18 secured to the inlet 14 of the flow tube 12, a second coupler 20 secured to the outlet 16 of the flow tube 12, a first piezo element 22 secured to the first coupler 18, a second piezo element 24 secured to the second coupler 20 to define a predetermined distance D between the first piezo element 22 and the second piezo element 24, and at least one absorber sleeve 26 engaged with the first coupler 18, the flow tube 12, and the second coupler 20. In contrast to only providing the absorber sleeve 26 on the flow tube and not contacting or engaging the first and second couplers 18,20, providing at least one absorber sleeve 26 engaged with the first coupler 18, the flow tube 12, and the second coupler 20 reduces the amount of ultrasonic energy being transmitted into the material of the flow tube 12 via the first and second couplers 18,20, thereby reducing the amount of signal noise. The flow sensor sub-assembly 10 may be utilized in connection with the flow sensor system 1 of FIG. 1, although the flow sensor sub-assembly 10 may also be utilized with other suitable flow sensor systems.

As shown in FIGS. 3, 3A, and 3B, in one aspect or embodiment, the at least one absorber sleeve 26 includes a first absorber sleeve 28 engaged with the first coupler 18 and the flow tube 12 and a second absorber sleeve 30 engaged with the second coupler 20 and the flow tube 12. The first absorber sleeve 28 is spaced from the second absorber sleeve 30 to define a gap 32. The flow tube 12 is not covered by any absorbing material in the gap 32 between the first absorber sleeve 28 and the second absorber sleeve 30. The first absorber sleeve 28 is directly engaged with both the first coupler 18 and the flow tube 12. The second absorber sleeve 30 is directly engaged with both the second coupler 20 and the flow tube 12.

In another aspect or embodiment, rather than providing the first absorber sleeve 28 and the second absorber sleeve 30, the at least one absorber sleeve 26 includes a single piece of material that engages the first coupler 18, extends along the flow tube 12, and engages the second coupler 20.

In one aspect or embodiment, the first absorber sleeve 28 and the second absorber sleeve 30 each cover at least 10% of a length of the flow tube 12 between the first and second couplers 18,20. In one aspect or embodiment, the first absorber sleeve 28 and the second absorber sleeve 30 each cover 25% of the length of the flow tube 12 between the first and second couplers 18,20. In one aspect or embodiment, the first absorber sleeve 28 and the second absorber sleeve 30 each have an outer diameter of 6.2 mm, an inner diameter over the flow tube 12 of 1.38 mm, and an inner diameter over the first and second couplers 18,20 of 2.91 mm. In one aspect or embodiment, a 12 mm length of the flow tube 12 is in direct contact with each of the first and second absorber sleeves 28,30.

In one aspect or embodiment, the at least one absorber sleeve 26 is manufactured from a thermoplastic polyurethane and the flow tube 12 is manufactured from stainless steel. The thermoplastic polyurethane may be Pellethane® from Lubrizol. The thermoplastic polyurethane may have a Shore hardness in the range of 53D-76D or 80A-91A as tested pursuant to ASTM D2240. In one aspect or embodiment, the at least one absorber sleeve 26 is manufactured from Pellethane® 2363-55DE from Lubrizol. Other materials having suitable acoustic dampening characteristics, such as polyoxymethylene (POM), may also be utilized.

Referring again to FIGS. 3, 3A, and 3B, the flow tube 12 is secured to the first coupler 18 and the second coupler 20 via the at least one absorber sleeve 26. More specifically, in one aspect or embodiment, there is no fixed, direct connection between the first and second couplers 18,20 and the flow tube 12 such that the first and second couplers 18,20 are not constrained relative to the flow tube 12 thereby increasing the strength of the ultrasonic waves. An interface between the first and second couplers 18,20 and the flow tube 12 is free from adhesive with the at least one absorber sleeve securing the first and second couplers 18,20 to the flow tube 12.

In one aspect or embodiment, the at least one absorber sleeve 26 is press-fit to the first and second couplers 18,20 and the flow tube 12. In one aspect or embodiment, the at least one absorber sleeve 26 is adhered to the first and second couplers 18,20 and the flow tube 12. In one aspect or embodiment, the at least one absorber sleeve 26 is overmolded onto the first and second couplers 18,20 and the flow tube 12. Various combinations of these and other securing techniques may be utilized to secure the at least one absorber sleeve 26 to the first and second couplers 18,20 and the flow tube 12.

Figure 4:
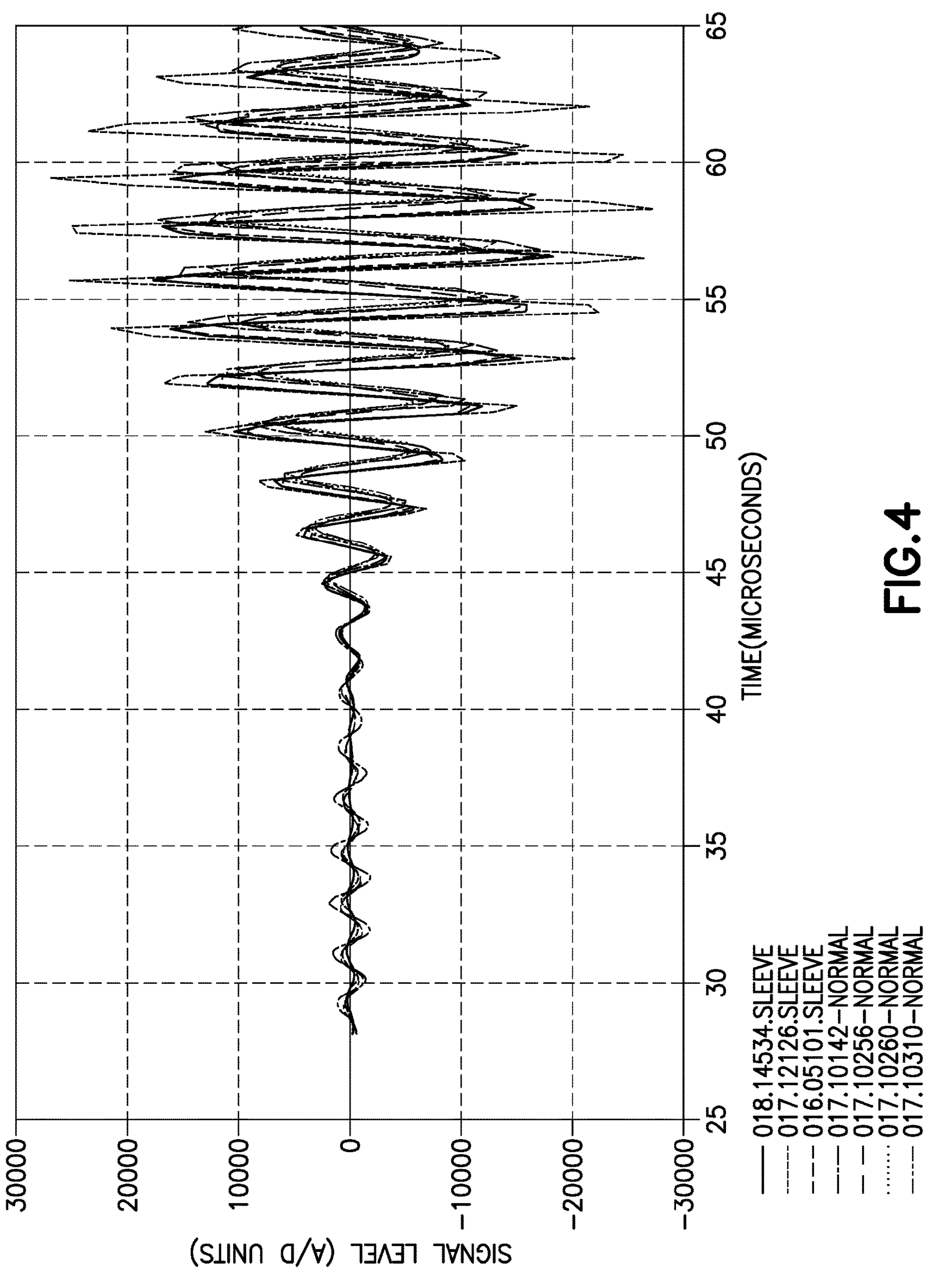
FIG. 4 is a graph of signal level versus time comparing the flow tube sub-assembly of FIG. 3 with a conventional flow tube sub-assembly.
Figure 5:
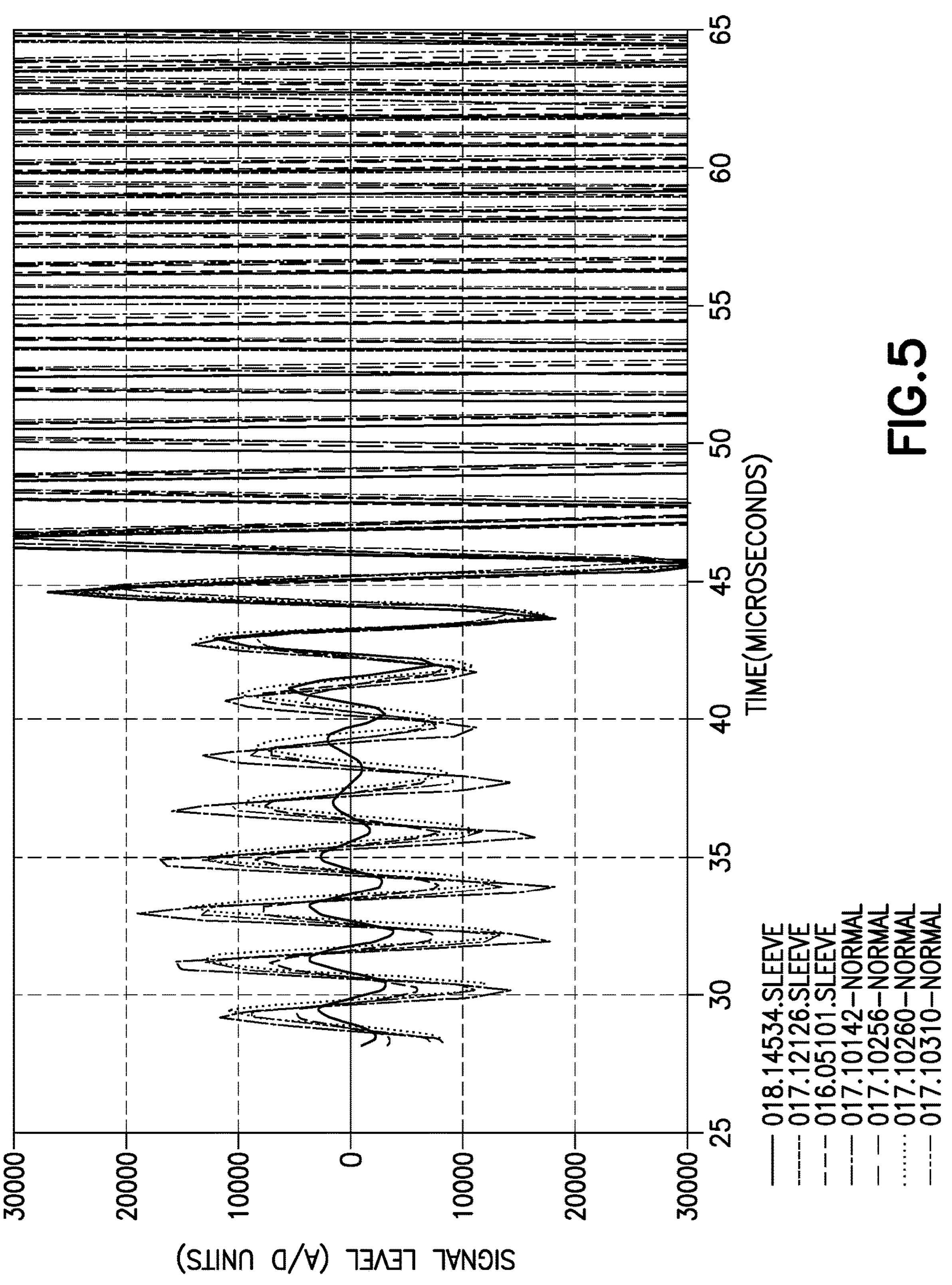
FIG. 5 is an enlarged graph of signal level versus time comparing the flow tube sub-assembly of FIG. 3 with a conventional flow tube sub-assembly.

Referring to FIGS. 4 and 5, a graph of signal level versus time is shown, which compares the flow tube sub-assembly 10 of FIG. 3 with a conventional flow tube sub-assembly. As shown in FIG. 4, the signal level of energy coming through the fluid is higher with the flow tube sub-assembly 10 of FIG. 3 compared to conventional flow tube sub-assemblies. Further, as shown in FIG. 5, the noise level of energy coming through the flow tube 12 is lower with the flow tube sub-assembly 10 of FIG. 3 compared to conventional flow tube sub-assemblies.

Accordingly, the flow tube sub-assembly 10 of the present application improves the signal-to-noise ratio by providing a higher fluid signal and lower flow-tube noise signal compared to conventional flow tube sub-assemblies. The flow tube sub-assembly 10 also eliminates the need for a separate assembly method between the couplers 18,20 and the flow tube 12.

While this disclosure has been described as having exemplary designs, the present disclosure can be further modified within the spirit and scope of this disclosure. This application is therefore intended to cover any variations, uses, or adaptations of the disclosure using its general principles. To the extent possible, one or more features of any embodiment or aspect can be combined with one or more features of any other embodiment or aspect. Further, this application is intended to cover such departures from the present disclosure as come within known or customary practice in the art to which this disclosure pertains and which fall within the limits of the appended claims.

What is claimed is:

1. A flow sensor for sensing flow of a fluidic medicament, the flow sensor comprising:

a flow tube having an inlet and an outlet;

a first coupler secured to the inlet of the flow tube;

a second coupler secured to the outlet of the flow tube; and at least one absorber sleeve having an inner diameter directly engaged with at least one of the first coupler or the second coupler over the at least one of the first coupler or the second coupler.

2. The flow sensor of claim 1, further comprising:

a first piezo element secured to the first coupler; and a second piezo element secured to the second coupler to define a predetermined distance between the first piezo element and the second piezo element, wherein the at least one absorber sleeve is further directly engaged with the flow tube.

3. The flow sensor of claim 1, wherein the at least one absorber sleeve comprises a first absorber sleeve engaged with the first coupler and the flow tube and a second absorber sleeve engaged with the second coupler and the flow tube, the first absorber sleeve spaced from the second absorber sleeve to define a gap, wherein the flow tube is not covered by any absorbing material in the gap between the first absorber sleeve and the second absorber sleeve.

4. The flow sensor of claim 1, wherein the at least one absorber sleeve comprises a first absorber sleeve engaged with the first coupler and the flow tube and a second absorber sleeve engaged with the second coupler and the flow tube, the first absorber sleeve spaced from the second absorber sleeve to define a gap, wherein each of the first absorber sleeve and the second absorber sleeve cover at least 10% of the flow tube between the first and second couplers.

5. The flow sensor of claim 4, wherein each the first absorber sleeve and the second absorber sleeve cover at least 25% of the flow tube between the first and second couplers.

6. The flow sensor of claim 1, wherein the at least one absorber sleeve comprises a thermoplastic polyurethane and the flow tube comprises stainless steel.

7. The flow sensor of claim 1, wherein the flow tube is secured to the first coupler and the second coupler via the at least one absorber sleeve.

8. The flow sensor of claim 1, wherein an interface between the first and second couplers and the flow tube is free from adhesive.

9. The flow sensor of claim 1, wherein the at least one absorber sleeve is press-fit to the first and second couplers and the flow tube.

10. The flow sensor of claim 1, wherein the at least one absorber sleeve is adhered to the first and second couplers and the flow tube.

11. The flow sensor of claim 1, wherein the at least one absorber sleeve is directly engaged with each of the first coupler and the second coupler.

12. A flow sensor for sensing flow of a fluidic medicament comprising:

a flow tube having an inlet and an outlet;

a first coupler secured to the inlet of the flow tube;

a second coupler secured to the outlet of the flow tube; and at least one sleeve including an absorbing material, wherein the at least one sleeve secures the flow tube to the first coupler and the second coupler, and wherein there is separation between the first coupler and the flow tube along a longitudinal direction of the flow tube, and wherein there is separation between the second coupler and the flow tube along the longitudinal direction of the flow tube.

13. The flow sensor of claim 12, further comprising:

a first piezo element secured to the first coupler; and a second piezo element secured to the second coupler to define a predetermined distance between the first piezo element and the second piezo element.

14. The flow sensor of claim 12, wherein the at least one sleeve comprises a first sleeve engaged with the first coupler and the flow tube and a second sleeve engaged with the second coupler and the flow tube, the first sleeve spaced from the second sleeve to define a gap, wherein the flow tube is not covered by any absorbing material in the gap between the first sleeve and the second sleeve.

15. The flow sensor of claim 12, wherein the at least one sleeve comprises a first sleeve engaged with the first coupler and the flow tube and a second sleeve engaged with the second coupler and the flow tube, the first sleeve spaced from the second sleeve to define a gap, wherein each of the first sleeve and the second sleeve cover at least 10% of the flow tube between the first and second couplers.

16. The flow sensor of claim 15, wherein each of the first sleeve and the second sleeve cover at least 25% of the flow tube between the first and second couplers.

17. The flow sensor of claim 12, wherein the at least one sleeve comprises a thermoplastic polyurethane and the flow tube comprises stainless steel.

18. The flow sensor of claim 12, wherein an interface between the first and second couplers and the flow tube is free from adhesive.

19. The flow sensor of claim 12, wherein the at least one sleeve is at least one of press-fit to the first and second couplers and the flow tube, adhered to the first and second couplers and the flow tube, or any combination thereof.

* * * * *